United States Patent
Yu et al.

(10) Patent No.: US 10,069,665 B2
(45) Date of Patent: Sep. 4, 2018

(54) METHOD AND DEVICE FOR TRANSMITTING AND RECEIVING SIGNAL BY USING MODULATION TECHNIQUES IN WIRELESS COMMUNICATION SYSTEM

(71) Applicant: Samsung Electronics Co., Ltd, Gyeonggi-do (KR)

(72) Inventors: Hyun-Kyu Yu, Gyeonggi-do (KR); Won-Il Roh, Gyeongi-do (KR); Jeong-Ho Park, Seoul (KR); Min Sagong, Gyeonggi-do (KR); Ji-Yun Seol, Gyeonggi-do (KR); Chi-Woo Lim, Gyeonggi-do (KR); Kyung-Whoon Cheun, Seoul (KR); Jae-Weon Cho, Gyeonggi-do (KR); Sung-Nam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 14/654,798

(22) PCT Filed: Dec. 23, 2013

(86) PCT No.: PCT/KR2013/012010
§ 371 (c)(1),
(2) Date: Jun. 22, 2015

(87) PCT Pub. No.: WO2014/098537
PCT Pub. Date: Jun. 26, 2014

(65) Prior Publication Data
US 2015/0358194 A1  Dec. 10, 2015

(30) Foreign Application Priority Data
Dec. 21, 2012  (KR) ........................ 10-2012-0150394

(51) Int. Cl.
*H04B 1/00* (2006.01)
*H04L 27/10* (2006.01)
(Continued)

(52) U.S. Cl.
CPC ............ *H04L 27/10* (2013.01); *H04L 1/0003* (2013.01); *H04L 1/1812* (2013.01);
(Continued)

(58) Field of Classification Search
CPC ..... H04L 27/10; H04L 27/32; H04L 27/0008; H04L 1/0003; H04L 1/1812; H04L 27/34
See application file for complete search history.

(56) References Cited

U.S. PATENT DOCUMENTS 7,525,988 B2 * 4/2009 Kim .................... H04B 7/0417
370/465
8,155,045 B2 * 4/2012 Sherman ............. H04L 12/1881
370/312
(Continued)

FOREIGN PATENT DOCUMENTS

CN  1954573 A   4/2007
EP  0490552 A2  12/1991
(Continued)

OTHER PUBLICATIONS

International Search Report dated Mar. 14, 2014 in connection with International Patent Application No. PCT/KR2013/012010, 7 pages.
(Continued)

*Primary Examiner* — Phuc Tran

(57) ABSTRACT

Disclosed is a method and device for transmitting and receiving a signal by using modulation techniques in a wireless communication system. The method according to the present invention includes: selecting one of QAM and improved QAM according to at least one predefined criterion; encoding information bits to be transmitted according
(Continued)

to a first encoding scheme and mapping encoded information bits to QAM symbols when the QAM is selected; encoding information bits to be transmitted according to a second encoding scheme and mapping encoded information bits to improved QAM symbols when the improved QAM is selected; and transmitting the QAM symbols or the improved QAM symbols through a given resource region.

26 Claims, 12 Drawing Sheets

(51) Int. Cl.
  *H04L 1/18* (2006.01)
  *H04L 27/34* (2006.01)
  *H04L 1/00* (2006.01)
  *H04L 27/00* (2006.01)
  *H04L 27/32* (2006.01)

(52) U.S. Cl.
  CPC .......... *H04L 27/0008* (2013.01); *H04L 27/32* (2013.01); *H04L 27/34* (2013.01)

(56) References Cited

U.S. PATENT DOCUMENTS

| | | | |
|---|---|---|---|
| 8,270,432 B2* | 9/2012 | Kim | H04B 7/0417 370/465 |
| 8,681,886 B2* | 3/2014 | Taoka | H04L 1/0003 375/260 |
| 2005/0197065 A1 | 9/2005 | Tamaki et al. | |
| 2005/0286402 A1 | 12/2005 | Byun et al. | |
| 2006/0262871 A1 | 11/2006 | Cho et al. | |
| 2007/0171714 A1 | 7/2007 | Wu et al. | |
| 2007/0260959 A1* | 11/2007 | Sidi | H03M 13/256 714/755 |
| 2008/0240159 A1 | 10/2008 | Palanki et al. | |
| 2009/0075686 A1 | 3/2009 | Gomadam et al. | |
| 2009/0316591 A1 | 12/2009 | Reial et al. | |
| 2010/0067367 A1* | 3/2010 | Choi | H04L 5/0064 370/210 |
| 2010/0098185 A1* | 4/2010 | Miyazaki | H04B 7/0669 375/267 |
| 2011/0078533 A1* | 3/2011 | Zhou | H03M 13/253 714/752 |
| 2011/0182337 A1* | 7/2011 | Taoka | H04L 1/0003 375/224 |
| 2012/0033618 A1* | 2/2012 | Wallace | H04B 7/043 370/328 |
| 2012/0163444 A1 | 6/2012 | Oh et al. | |
| 2013/0272353 A1* | 10/2013 | Fox | H04L 1/0003 375/222 |
| 2015/0029964 A1* | 1/2015 | Seo | H04L 1/0027 370/329 |
| 2015/0358194 A1* | 12/2015 | Yu | H04L 27/10 370/329 |

FOREIGN PATENT DOCUMENTS

| | | |
|---|---|---|
| EP | 2081314 A2 | 7/2009 |
| EP | 2134051 A1 | 12/2009 |
| JP | 2005-252745 A | 9/2005 |
| JP | 2006-303906 A | 11/2006 |
| JP | 2006-314110 A | 11/2006 |
| JP | 2009-524152 A | 6/2009 |
| JP | 2010539855 A | 12/2010 |
| JP | 2011-525740 A | 9/2011 |
| WO | 2006/027897 A1 | 3/2006 |
| WO | WO 2007/106876 A2 | 9/2007 |
| WO | 2012/075452 A1 | 6/2012 |

OTHER PUBLICATIONS

Written Opinion of the International Searching Authority dated Mar. 14, 2014 in connection with International Patent Application No. PCT/KR2013/012010, 7 pages.
Fadel F. Digham, et al., "Spectrally Efficient Hybrid FSK/QAM with Optimum Bit and Power Loading", IEEE International Conference on Communications, vol. 11, pp. 5022-5027, Jun. 2006.
Yongsang Kim, et al., "Design of Turbo Codes over GF(q) with q-ary Orthogonal Modulation", IEEE Transactions on Communications, vol. 59, No. 3, Mar. 2011, pp. 625-631.
Extended European Search Report dated Jul. 11, 2016 in connection with European Application No. 13864304.4, 12 pages.
Roberto Padovani, et al., "Coded Phase/Frequency Modulation", IEEE Transactions on Communications, vol. 34, Issue 5, Jan. 1, 1986, XP55281891, pp. 446-453.
Agilent Technologies, et al., "LTE Receiver Performance Using AMC with Realistic Noise", 3GPP TSG-RAN WG4 #56, Tdoc R4-103235, Madrid, Spain, Aug. 23-27, 2010, 5 pages.
Asma Latif, et al., "Performance of Hybrid MQAM-LFSK (HQFM) OFDM Transceiver in Rayleigh Fading Channels", Multitopic Conference, 2006, INMIC '06, IEEE, Dec. 1, 2006, XP031085690, pp. 52-55.
Office Action dated Nov. 6, 2017 in connection with Japanese Patent Application No. 2015-549267.
Office Action dated Nov. 28, 2017 in connection with Chinese Patent Application No. 201380072283.4.

* cited by examiner

METHOD AND DEVICE FOR TRANSMITTING AND RECEIVING SIGNAL BY USING MODULATION TECHNIQUES IN WIRELESS COMMUNICATION SYSTEM

CROSS-REFERENCE TO RELATED APPLICATION(S)

The present application claims priority under 35 U.S.C. § 365 to International Patent Application No. PCT/KR2013/012010 filed Dec. 23, 2013, entitled "METHOD AND DEVICE FOR TRANSMITTING AND RECEIVING SIGNAL BY USING MODULATION TECHNIQUES IN WIRELESS COMMUNICATION SYSTEM", and, through International Patent Application No. PCT/KR2013/012010, to Korean Application No. 10-2012-0150394 filed Dec. 21, 2012, each of which are incorporated herein by reference into the present disclosure as if fully set forth herein.

TECHNICAL FIELD

The present disclosure relates generally to signal transmission and reception in a communication system, and more particularly, to a method and apparatus for supporting various Modulation and Coding Schemes (MCSs) for transmission and reception of signals.

BACKGROUND ART

To satisfy ever-increasing demands for wireless data traffic, wireless communication systems have been developed to support higher data rates. For this purpose, a wireless communication system seeks to improve spectral efficiency and increase channel capacity, for example, by communication techniques such as Orthogonal Frequency Division Multiple Access (OFDMA), Multiple Input Multiple Output (MIMO), and the like.

On the other hand, cell-edge users having a low Signal-to-Noise Ratio (SNR) at a cell edge remote from a cell center or cell-edge users having a low Carrier-to-Interference and Noise Ratio (CINR) due to severe interference from a Base Station (BS) of a neighbor cell limit an overall system performance in a wireless mobile communication system. Accordingly, to increase the transmission efficiency of such cell-edge users, techniques such as Inter-Cell Interference-Coordination (ICIC), Coordinated Multi-Point (COMP), interference cancellation of a receiver, and the like have been developed.

While those techniques have been studied from the perspective of interference control at a transmitter or interference cancellation at a receiver, there is a need for a technique that increases a channel capacity to an optimum level for a cell-edge user.

DISCLOSURE

Technical Problem

An aspect of the present disclosure is to provide a method and apparatus for transmitting and receiving a signal in a communication system.

Another aspect of the present disclosure is to provide a method and apparatus for transmitting and receiving a signal to support a plurality of Modulation and Coding Schemes (MCSs) in a wireless communication system.

Another aspect of the present disclosure is to provide a method and apparatus for reducing the computation complexity of a transmitter and a receiver in supporting various MCSs in a wireless communication system.

Another aspect of the present disclosure is to provide a method and apparatus for supporting various advanced Quadrature Amplitude Modulation (QAM) schemes in a wireless communication system.

Another aspect of the present disclosure is to provide a method and apparatus for supporting QAM and advanced QAM in a wireless communication system.

Another aspect of the present disclosure is to provide a method and apparatus for supporting QAM and hybrid FSK (Frequency Shift Keying) and QAM Modulation (FQAM) in which QAM and FSK are combined in a wireless communication system.

Another aspect of the present disclosure is to provide a method and apparatus for supporting QAM and hybrid TSK (Time Shift Keying) and QAM Modulation (TQAM) in which QAM and TSK are combined in a wireless communication system.

Technical Solution

In accordance with an aspect of the present disclosure, there is provided a method for transmitting a signal using a plurality of modulation schemes in a wireless communication system. The method includes selecting one of Quadrature Amplitude Modulation (QAM) and advanced QAM according to at least one predetermined criterion, encoding information bits to be transmitted in a first coding scheme and mapping the coded information bits to QAM symbols, if QAM is selected, encoding the information bits in a second coding scheme and mapping the coded information bits to advanced QAM symbols, if the advanced QAM is selected, and transmitting the QAM symbols or the advanced QAM symbols in a predetermined resource area.

In accordance with another aspect of the present disclosure, there is provided a method for receiving a signal that is transmitted using a plurality of modulation schemes in a wireless communication system. The method includes receiving, in a predetermined resource area, a signal transmitted in a modulation scheme being one of QAM and advanced QAM according to at least one predetermined criterion, selecting a modulation scheme applied to the received signal, calculating symbol Log Likelihood Ratios (LLRs) of symbols to be recovered from the received signal and recovering information bits by decoding the symbol LLRs in a first decoding scheme, if QAM is selected, and calculating bit LLRs of bits to be recovered from the received signal and recovering the information bits by decoding the bit LLRs in a second decoding scheme, if the advanced QAM is selected.

In accordance with another aspect of the present disclosure, there is provided an apparatus for transmitting a signal using a plurality of modulation schemes in a wireless communication system. The apparatus includes a selector for selecting one of QAM and advanced QAM according to at least one predetermined criterion, a first transmission path for, if QAM is selected, encoding information bits to be transmitted in a first coding scheme and mapping the coded information bits to QAM symbols, a second transmission path for, if the advanced QAM is selected, encoding the information bits in a second coding scheme and mapping the coded information bits to advanced QAM symbols, and a resource mapper for transmitting the QAM symbols or the advanced QAM symbols in a predetermined resource area.

In accordance with another aspect of the present disclosure, there is provided an apparatus for receiving a signal that is transmitted using a plurality of modulation schemes in a wireless communication system. The apparatus includes a demapper for receiving, in a predetermined resource area, a signal transmitted in a modulation scheme being one of QAM and advanced QAM according to at least one predetermined criterion, a selector for selecting a modulation scheme applied to the received signal, a first reception path for, if QAM is selected, calculating symbol LLRs of symbols to be recovered from the received signal and recovering information bits by decoding the symbol LLRs in a first decoding scheme, and a second reception path for, if the advanced QAM is selected, calculating bit LLRs of bits to be recovered from the received signal and recovering the information bits by decoding the bit LLRs in a second decoding scheme.

BEST MODE

Preferred embodiments of the present disclosure will be described below in detail with reference to the attached drawings. A detailed description of a known function or structure will not be provided herein lest it should obscure the subject matter of the present disclosure. The terms used in the following description are defined in consideration of their functions in the present disclosure and may vary according to the intent of a user or an operator or the customs. Therefore, the present disclosure should be defined by the appended claims and their equivalents.

Embodiments of the present disclosure relate to a technique for combining a bandwidth-efficient modulation scheme with a power-efficient modulation scheme, for transmission and reception in a wireless mobile communication system. Specifically, the following description is given of a method and apparatus for performing Quadrature Amplitude Modulation (QAM) and advanced QAM.

QAM is a modulation scheme used to make the property of an interference signal approach Gaussian interference as much as possible. However, since a non-Gaussian channel has a larger channel capacity than a Gaussian channel, appropriate decoding may lead to higher decoding performance in the non-Gaussian channel than in the Gaussian channel. Advanced QAM is a QAM-based modulation scheme that renders neighbor cell interference to be non-Gaussian. Advanced QAM schemes include FQAM being a hybrid QAM and FSK modulation scheme and TQAM being a hybrid QAM and TSK modulation scheme. While exemplary advanced QAM schemes will be described below, these should not be construed as limiting the present disclosure and it is clear to those skilled in the art that the present disclosure can be extended to a modulation scheme that renders neighbor cell interference to be non-Gaussian.

Figure 1A:
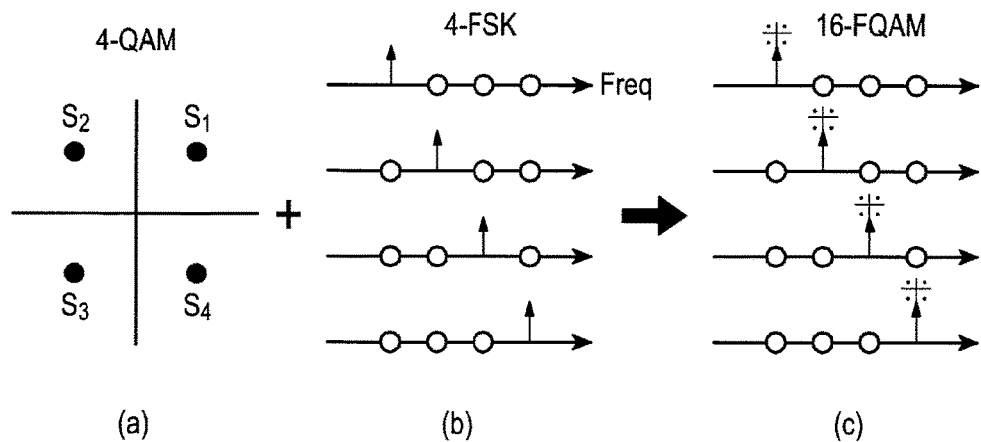
FIG. 1a is a view referred to for describing hybrid FSK and QAM Modulation (FQAM) according to an embodiment of the present disclosure.

FIG. 1a is a view referred to for describing FQAM according to an embodiment of the present disclosure. As illustrated in FIG. 1a, FQAM is a modulation scheme that loads information bits using a constellation and frequency positions. Herein, 16-QAM in which 4-ary QAM, that is, 4-QAM (QPSK) is combined with 4-FSK using four modulation frequencies is shown.

Referring to (a) of FIG. 1a, the constellation of 4-QAM includes four signal points $S_1$, $S_2$, $S_3$, and $S_4$ to which a modulated digital signal may be mapped. The signal points are complex modulation symbols (a, a), (−a, a), (−a, −a), and (a, −a) each having the same magnitude and a phase difference of 90 degrees from the other signal points. For example, information sequences '00', '01', '10', and '11' may be mapped to the signal points, respectively. Referring to (b) of FIG. 1a, 4-FSK transmits an information sequence in one of 4 different modulation frequencies. For example, a signal pulse $f_1$, $f_2$, $f_3$, or $f_4$ may be transmitted for the information sequence '00', '01', '10', or '11'.

Referring to (c) of FIG. 1a, one of the four signal points $S_1$, $S_2$, $S_3$, and $S_4$ may be transmitted in one of the four modulation frequencies $f_1$, $f_2$, $f_3$, and $f_4$ in 16-FQAM in which 4-QAM is combined with 4-FSK. In 16-FQAM, therefore, 16 pieces of information (that is, four information bits) may be transmitted in the same amount of transmission resources as in 4-QAM or 4-FSK. The modulation order M of FQAM may be determined to the product between the modulation order $M_Q$ of QAM and the modulation order $M_F$ of FSK.

While single-tone FQAM is illustrated in FIG. 1a, Multi-Tone FQAM (MT-FQAM) may be implemented, in which bit information is loaded using various patterns of a plurality of frequencies. MT-FQAM is designed by combining QAM with MT-FSK.

Figure 1B:
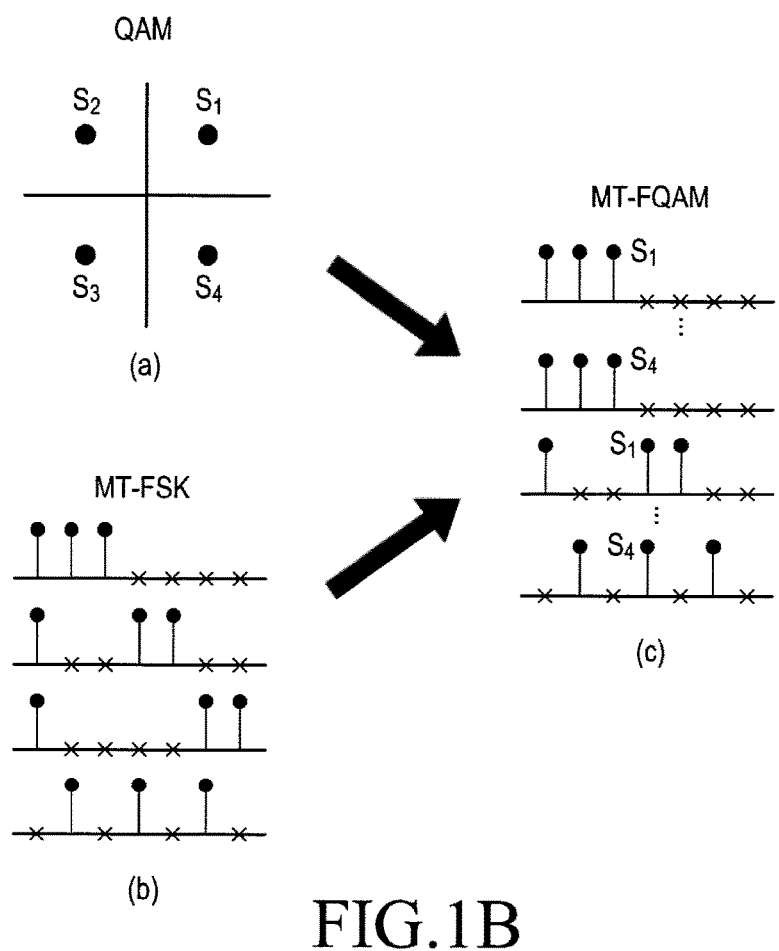
FIG. 1b is a view referred to for describing Multi-Tone FQAM (MT-FQAM)) according to an embodiment of the present disclosure.

FIG. 1b is a view referred to for describing MT-FQAM according to an embodiment of the present disclosure. In MT-FQAM, 4-QAM (QPSK) is combined with MT-FSK that uses 7 frequency tones and 4 frequency tone combination patterns, by way of example.

Referring to (a) of FIG. 1b, the constellation of 4-QAM includes four signal points $S_1$, $S_2$, $S_3$, and $S_4$ to which a modulated digital signal may be mapped. The signal points are complex modulation symbols (a, a), (−a, a), (−a, −a), and (a, −a) each having the same magnitude and a phase difference of 90 degrees from the other signal points. For example, information sequences '00', '01', '10', and '11' may be mapped to the signal points, respectively. Referring to (b) of FIG. 1a, 7-FSK transmits an information sequence in 3 out of 7 different frequency tones. For example, a signal pulse set $(f_1, f_2, f_3)$, $(f_1, f_4, f_5)$, $(f_1, f_6, f_7)$, or $(f_4, f_6)$ may be transmitted for the information sequence '00', '01', '10', or '11'.

Referring to (c) of FIG. 1b, one of the four signal points $S_1$, $S_2$, $S_3$, and $S_4$ may be transmitted in 3 out of the 7 frequency tones $f_1$, $f_2$, . . . , $f_7$ in MT-FQAM in which 4-QAM is combined with MT-FSK. In MT-FQAM, therefore, 16 pieces of information (that is, four information bits) may be transmitted in the same amount of transmission resources as in 4-QAM or 7-FSK.

Figure 1C:
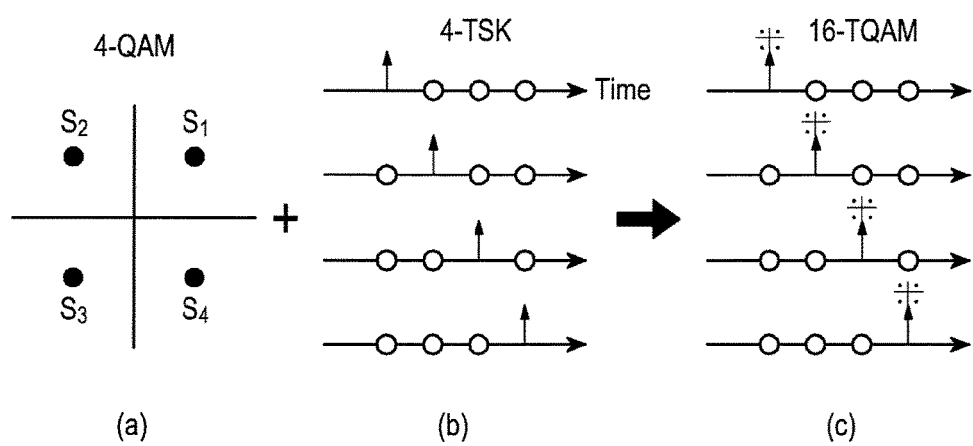
FIG. 1c is a view referred to for describing hybrid TSK and QAM Modulation (TQAM) according to an embodiment of the present disclosure.

FIG. 1c is a view referred to for describing TQAM according to an embodiment of the present disclosure. TQAM is a modulation scheme in which information bits are loaded using a constellation and time positions. Herein, an example of 16-TQAM is illustrated, in which 4-art QAM, that is, 4-QAM (QPSK) is combined with 4-TSK that uses 4 time symbols (OFDMA symbols).

Referring to (a) of FIG. 1c, the constellation of 4-QAM includes four signal points $S_1$, $S_2$, $S_3$, and $S_4$ to which a modulated digital signal may be mapped. The signal points are complex modulation symbols (a, a), (−a, a), (−a, −a), and (a, −a) each having the same magnitude and a phase difference of 90 degrees from the other signal points. For example, information sequences '00', '01', '10', and '11' may be mapped to the signal points, respectively. Referring to (b) of FIG. 1c, 4-TSK transmits an information sequence in one of four different OFDM symbols. For example, an OFDMA symbol s[1], s[2], s[3], or s[4] may be transmitted for the information sequence '00', '01', '10', or '11'.

Referring to (c) of FIG. 1c, one of the four signal points $S_1$, $S_2$, $S_3$, and $S_4$ may be transmitted in one of the four OFDMA symbols s[1], s[2], s[3], and s[4] in 16-TQAM in which 4-QAM is combined with 4-TSK. In 16-TQAM, therefore, 16 pieces of information (that is, four information bits) may be transmitted in the same amount of transmission resources as in 4-QAM or 4-TSK. The modulation order M of FQAM may be determined to the product between the modulation order $M_Q$ of QAM and the modulation order $M_T$ of TSK.

QAM is used mainly to maximize bandwidth efficiency in a multi-cellular environment without severe interference. In M-ary QAM, coded bits that optimize modulation efficiency may be mapped to M-ary symbols. Since there is little efficiency difference caused by the modulation order M, QAM is usually combined with a binary coding scheme having low complexity, rather than with a non-binary/M-ary coding scheme.

On the other hand, to maximize modulation efficiency, advanced QAM is combined with a non-binary coding scheme that is not affected by bit-to-symbol mapping or requires a technique that maximizes bit-to-symbol mapping efficiency. However, the non-binary coding scheme and the technique maximizing bit-to-symbol mapping efficiency bring about a very large computation complexity in coding and decoding.

Therefore, different coding schemes are applied according to different modulation schemes in later-described embodiments of the present disclosure. Specifically, QAM and advanced QAM are supported using different coding schemes.

A transmitter selects one of QAM and advanced QAM according to at least one predetermined criterion.

In an embodiment of the present disclosure, a modulation scheme may be selected based on Signal-to-Interference Noise Ratio (SINR). Since advanced QAM basically includes power-efficient FSK, advanced QAM performs well at a low SINR, relative to QAM. Accordingly, on a downlink, a Base Station (BS) transmits a signal to a Mobile Station (MS) having a reception SINR higher than an SINR threshold (or equal to or higher than the SINR threshold) in QAM and to an MS having a reception SINR lower than the SINR threshold in advanced QAM. The MS may report its reception SINR to the BS by a Channel Quality Indicator (CQI). The MS may select a modulation scheme according to a similar criterion on an uplink. In another embodiment of the present disclosure, the BS may select a modulation scheme for an uplink according to an SINR measurement of the uplink and indicate the selected modulation scheme to the MS.

In another combinable embodiment of the present disclosure, a modulation scheme may be selected depending on a signal type to be transmitted or whether Hybrid Automatic Repeat reQuest (HARQ) is supported. If a non-binary channel decoder is used, decoding may take much time, making fast transmission of an HARQ response (ACKnowledgement (ACK) or Negative ACK (NACK)) difficult. Therefore, a transmitter may select a modulation scheme according to the type of a transmission signal. Specifically, the transmitter may select advanced QAM for a non-HARQ signal such as a broadcast signal, a multicast signal, a unicast control signal, or the like and QAM for an HARQ signal. In an optional embodiment of the present disclosure, a maximum waiting time for an HARQ response may be set to be longer for an advanced QAM signal than for a QAM signal and the transmitter may select QAM or advanced QAM according to a maximum waiting time set for a transmission signal. That is, different HARQ timings may be set for QAM and advanced QAM.

In another combinable embodiment of the present disclosure, a modulation scheme may be selected based on MS capabilities. The BS determines whether an MS supports advanced QAM and selects advanced QAM only for a signal directed to an MS supporting advanced QAM. The BS may acquire information about the capabilities of the MS, when the MS enters the BS or during negotiation between the BS and the MS.

In another combinable embodiment of the present disclosure, a modulation scheme may be selected by additionally taking into account a parameter indicating a non-Gaussian degree of neighbor cell interference as well as a received signal strength.

As described before, since QAM renders neighbor cell interference to be Gaussian, the Spectral Efficiency (SE) of QAM is not affected by the non-Gaussian degree of the neighbor cell interference. On the other hand, since advanced QAM renders neighbor cell interference to be non-Gaussian, the SE of the advanced QAM is dependent on the non-Gaussian degree of the neighbor cell interference. The parameter indicating the non-Gaussian degree of neighbor cell interference is denoted by α, which may be fed back by an MS. For example, the MS may calculate the statistic parameter α by modeling a received signal on the assumption that the interference component of an interference channel has a Complex Generalized Gaussian (CGG) distribution.

Figure 1D:
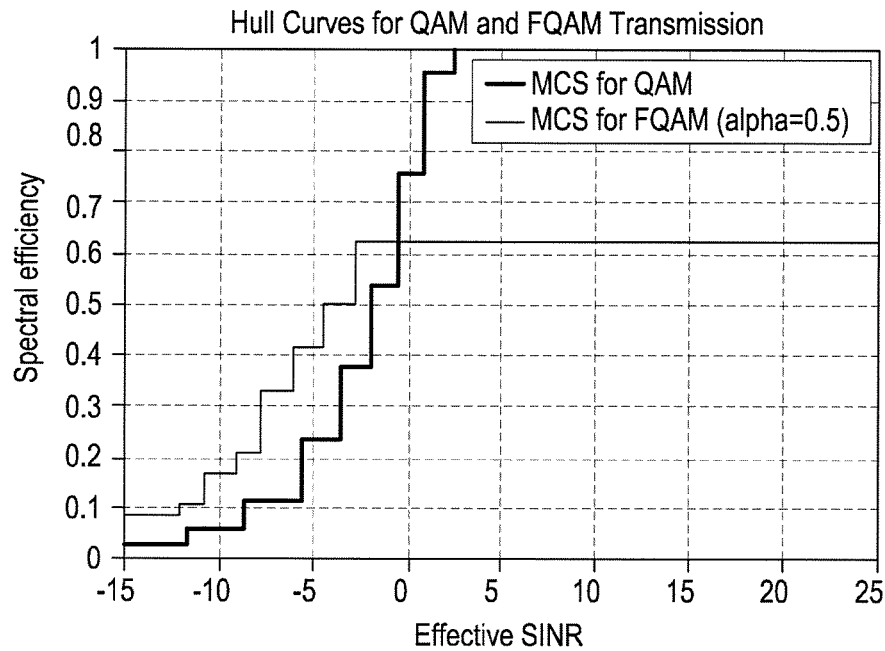
FIGS. 1d and 1e illustrate spectral efficiencies of QAM and FQAM for different values of a statistic parameter α.
Figure 1E:
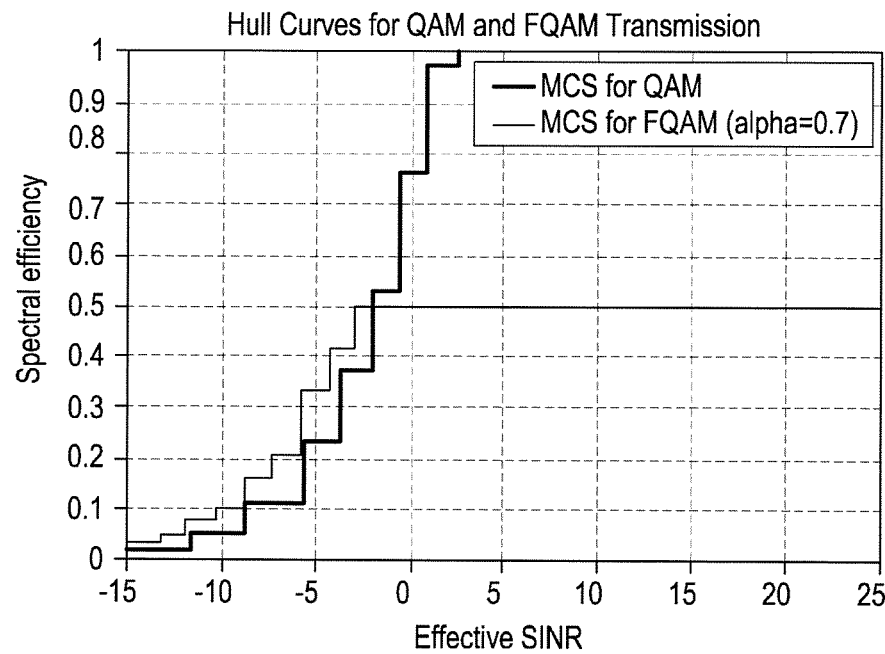

FIGS. 1d and 1e illustrate the SEs of QAM and FQAM for different values of the statistic parameter α. FIG. 1d illustrates Hull curves of QAM and FQAM with respect to SE changes, for α=0.5, and FIG. 1e illustrates Hull curves of QAM and FQAM with respect to SE changes, for α=0.7. Referring to FIG. 1d, if α=0.5, QAM has a higher SE at an SINR equal to or larger than −0.54106. Referring to FIG. 1e, if α=0.7, QAM has a higher SE at an SINR equal to or larger than −2.02097.

[Table 1] and [Table 2] list MCSs of FQAM for SINRs and SEs, when α=0.5 and α=0.7, respectively.

TABLE 1

| SNR [dB] | SE | MCS for FQAM(alpha = 0.5) |
| --- | --- | --- |
| −15 | 0.0835 | 4F4QAM R = 1/12 |
| −12.1 | 0.10425 | 4F8QAM R = 1/12 |
| −10.8 | 0.167 | 4F4QAM R = 1/6 |
| −9.1 | 0.2085 | 4F8QAM R = 1/6 |
| −7.8 | 0.334 | 4F4QAM R = 1/3 |
| −6.1 | 0.417 | 4F8QAM R = 1/3 |
| −4.5 | 0.5 | 4F4QAM R = 1/2 |
| −2.75 | 0.625 | 4F8QAM R = 1/2 |

TABLE 2

| SNR [dB] | SE | MCS for FQAM(alpha = 0.7) |
| --- | --- | --- |
| −15 | 0.04175 | 4F4QAM R = 1/24 |
| −13.25 | 0.052125 | 4F8QAM R = 1/24 |
| −11.8 | 0.0835 | 4F4QAM R = 1/12 |
| −10.25 | 0.10425 | 4F8QAM R = 1/12 |
| −8.8 | 0.167 | 4F4QAM R = 1/6 |
| −7.25 | 0.2085 | 4F8QAM R = 1/6 |
| −5.8 | 0.334 | 4F4QAM R = 1/3 |
| −4.25 | 0.417 | 4F8QAM R = 1/3 |
| −3 | 0.5 | 4F4QAM R = 1/2 |

Here, xFyQAM represents FSK having modulation order x and QAM having modulation order y and R represents an effective code rate. As noted from the above tables, the MCS of FQAM is different according to the parameter α.

Accordingly, the BS sets an SINR threshold based on the parameter α fed back by the MS. If the feedback SINR is higher than the threshold, the BS selects QAM for the MS and otherwise, the BS selects FQAM for the MS. In an embodiment, the BS may store information about SINR thresholds matching ranges of the parameter α and upon receipt of the parameter α from the MS, the BS may determine an SINR threshold matching the received parameter α.

In another combinable embodiment of the present disclosure, a modulation scheme may be selected according to the position of resources to which a transmission signal is allocated. For example, if the system separates a QAM frequency band from an advanced QAM frequency band, the MCS of a specific data packet may be determined depending on whether the scheduler of the BS allocates the data packet to the QAM frequency band or the advanced QAM frequency band. Therefore, switching between QAM and advanced QAM is performed according to a scheduling policy about a frequency band to which a data packet is allocated.

Inputs for decision at the scheduler may include the afore-described received signal strength (that is, SINR), the parameter α indicating the non-Gaussian degree of neighbor cell interference, and HARQ support. Additionally, fairness of data packet allocation and the load state of an advanced QAM frequency band may be considered. That is, even though QAM is more suitable for transmission of a specific data packet, the scheduler may select advanced QAM for transmission of the data packet in order to fill an advanced QAM frequency band. This is because the performance of the advanced QAM frequency band can be maintained only when a specific cell transmits data in the advanced QAM frequency band.

A transmitter or a BS selects one of QAM and advanced QAM according to one or more of the foregoing embodiments of the present disclosure and encodes and modulates a signal in the selected modulation scheme. The selected modulation scheme is indicated directly to a receiver by predetermined signaling, for example, on a Physical Downlink Control Channel (PDCCH) or the receiver determines the selected modulation scheme according to a preset criterion.

Figure 2:
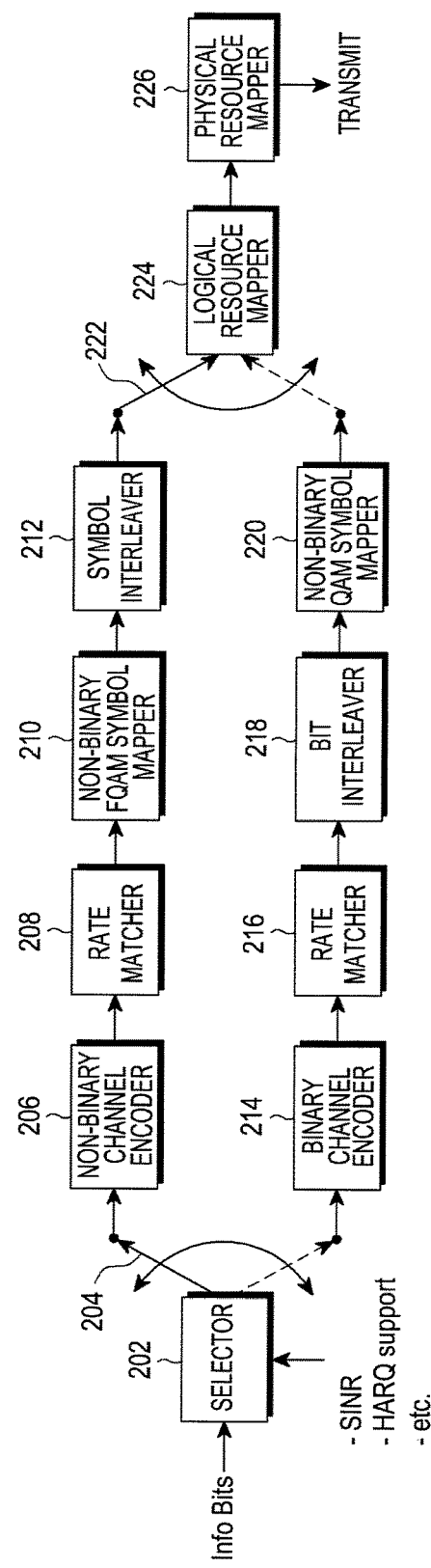
FIG. 2 is a block diagram of a transmitter supporting QAM and FQAM according to an embodiment of the present disclosure.

FIG. 2 is a block diagram of a transmitter supporting QAM and advanced QAM according to an embodiment of the present disclosure. The transmitter uses non-binary channel coding for advanced QAM and binary channel coding for QAM. While FQAM will be described below as an example of advanced QAM, it is obvious that the present disclosure is not limited to FQAM.

Referring to FIG. 2, a selector 202 selects a modulation scheme according to at least one preset criterion such as a reception SINR fed back from a receiver, HARQ support or non-support, a receiver capability, the non-Gaussian degree of neighbor cell interference, and/or the like. A switch 204 switches information bits input to the selector 202 to an FQAM path 206, 208, 210, and 212 or a QAM path 214, 216, 218, and 220 according to the selected modulation scheme.

In a combinable embodiment of the present disclosure, the selector 202 may act as a controller that additionally determines a modulation order(s) for QAM and/or FSK, a coding rate, a repetition number, and the like as well as a modulation scheme, based on given channel state information and additional parameters.

If the selector 202 selects FQAM, the information bits are provided to an M-ary channel encoder in the FQAM path, that is, a non-binary channel encoder 206. Herein, M is a positive integer larger than 2. The non-binary channel encoder 206 is configured to generate a parity bit for an input including a plurality of bits, compared to a binary channel encoder that generates a parity bit for a 1-bit input. For example, the non-binary channel encoder 206 is configured by connecting two Recursive Systematic Convolutional Coders (RSCCs) in parallel and generates parity bits simultaneously for a plurality of input bits. The non-binary channel encoder 206 may use, for example, a 16-ary turbo code, a 32-ary turbo code, or a 64-ary turbo code according to a given coding rate. In another embodiment of the present disclosure, at least one of the three turbo codes may not be used or may be replaced with another turbo code, or a turbo code may be added. The coding rate may be determined according to an MCS level selected as satisfying a target Frame Error Rate (FER) according to a measurement representing a channel state, such as an SNR, an SINR, or the like.

A rate matcher 208 matches a coded bit stream received from the non-binary channel encoder 206 to an intended transmission rate. An FQAM symbol mapper 210 maps the rate-matched bit stream to M-ary FQAM symbols.

The FQAM symbol mapper 210 outputs an FQAM symbol sequence by mapping a predetermined number of (e.g., $M=M_Q*M_F$) bit groups out of the rate-matched bit stream according to a given modulation order, that is, a modulation order M determined based on the modulation order $M_Q$ of QAM and the modulation order $M_F$ of FSK. The modulation order M may be determined according to an MCS level selected as satisfying a target FER according to a measurement representing a channel state, such as an SNR, an SINR, or the like.

A symbol interleaver 212 interleaves the FQAM symbol sequence received from the FQAM symbol mapper 210 according to a predetermined interleaving pattern and a switch 222 switches an interleaved symbol sequence to a logical resource mapper 224. The symbol interleaver 212 is configured to operate in consideration of at least one of the modulation order, the given coding rate, a repetition number, and the like.

The logical resource mapper 224 maps the input symbol sequence to a given logical resource area. A physical resource mapper 226 maps the symbol sequence mapped to the logical resource area to a given physical resource area. The logical resource mapper 224 allocates the input symbol sequence to frequency tones or subcarriers, taking into account FQAM, particularly FSK. The symbol sequence output from the physical resource mapper 226 is transmitted in the physical resource area via an air interface.

On the other hand, if the selector 202 selects QAM, the information bits are provided to a binary channel encoder 214 in the QAM path. A rate matcher 216 matches a coded bit stream received from the binary channel encoder 214 to an intended transmission rate. A bit interleaver 218 interleaves the rate-matched bit stream in a predetermined interleaving pattern. The bit interleaver 218 is configured to operate in consideration of at least one of a given coding rate and a given repetition number.

A QAM symbol mapper 220 maps a predetermined number of (e.g., M) bit groups out of the interleaved bit stream to QAM symbols according to a given modulation order M. The modulation order M may be determined according to an MCS level selected as satisfying a target FER according to a measurement representing a channel state, such as an SNR, an SINR, or the like. For example, the QAM symbol mapper 220 may generate modulation symbols in at least one of 4-QAM (i.e., QPSK), 16-QAM, 64-QAM, and any other QAM scheme. The switch 222 switches the QAM symbol sequence to the logical resource mapper 224.

The logical resource mapper 224 maps the input symbol sequence to a given logical resource area. The physical resource mapper 226 maps the symbol sequence mapped to the logical resource area to a given physical resource area. The symbol sequence output from the physical resource mapper 226 is transmitted in the physical resource area via an air interface.

Figure 3:
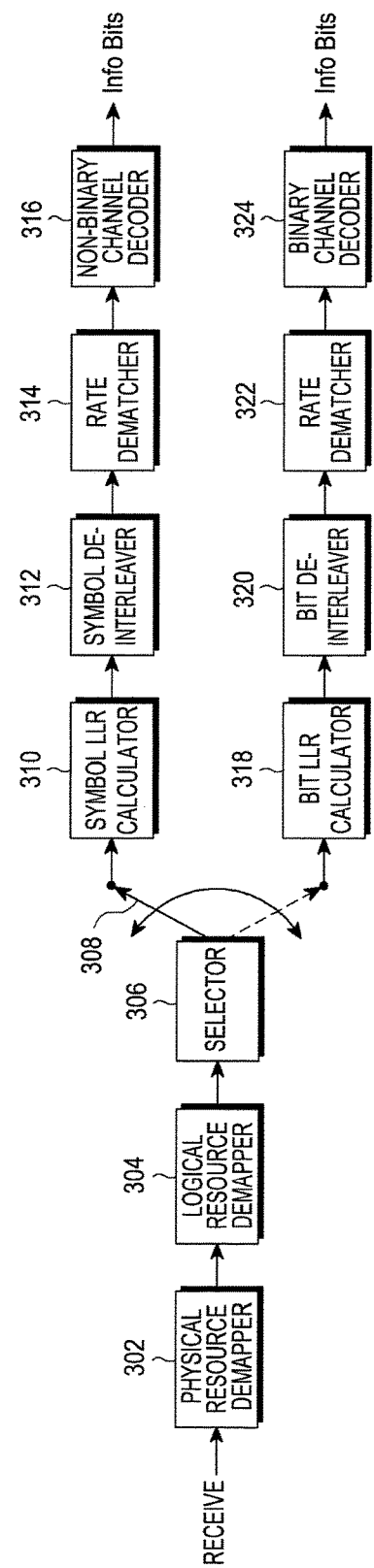
FIG. 3 is a block diagram of a receiver supporting QAM and FQAM according to an embodiment of the present disclosure.

FIG. 3 is a block diagram of a receiver supporting QAM and advanced QAM according to an embodiment of the present disclosure. The receiver is configured in correspondence with the configuration of the transmitter illustrated in FIG. 2. The receiver performs non-binary channel decoding to receive an advanced QAM signal and performs binary channel decoding to receive a QAM signal. While FQAM will be described below as an example of advanced QAM, it is obvious that the present disclosure is not limited to FQAM.

Referring to FIG. 3, a physical resource demapper 302 detects a signal mapped to a given physical resource area from a received signal. A logical resource demapper 304 detects a signal mapped to given logical resources from the detected signal. A selector 306 selects the same modulation scheme as used in the transmitter, as indicated by the transmitter. A switch 308 switches the received signal detected by the physical resource demapper 302 and the logical resource demapper 304 to one of a FQAM path 310, 312, 314, and 316 and a QAM path 318, 320, 322, and 324. In an optional embodiment of the present disclosure, the selector 306 may operate as a controller that additionally determines a modulation order(s) for QAM and/or FSK, a coding rate, a repetition number, and the like as well as a modulation scheme by the same selection algorithm as used in the transmitter, based on given channel state information and additional parameters.

If it is determined that the received signal was modulated in FQAM, the received signal is provided to a symbol Log Likelihood Ratio (LLR) calculator 310 of the FQAM path. The symbol LLR calculator 310 calculates the LLRs of symbols to be recovered from the received signal according to the modulation order of FQAM. A symbol deinterleaver 312 deinterleaves the symbol LLRs in a deinterleaving pattern corresponding to the interleaving pattern used in the symbol interleaver 212 of the transmitter. A rate dematcher 314 rate-dematches the deinterleaved LLRs on a symbol basis, reversely to the rate matching of the rate matcher 208 of the transmitter. The symbol deinterleaver 312 may be configured to operate in consideration of at least one of a modulation order, a coding rate, and a repetition number that are used in the transmitter. The rate dematcher 314 may also be configured to operate in consideration of the coding rate and the repetition number that are used in the transmitter.

A non-binary channel decoder 316 recovers information bits by channel-decoding the rate-dematched LLRs according to the modulation order and the coding rate used in the non-binary channel encoder 206 of the transmitter. The non-binary channel decoder 316 may include a 16-ary turbo decoder, a 32-ary turbo decoder, or a 64-ary turbo decoder according to the type of the non-binary channel encoder 206.

On the other hand, if it is determined that the received signal was modulated in QAM, the received signal is provided to a bit LLR calculator 318 of the QAM path. The bit LLR calculator 318 calculates the LLRs of bits to be recovered from the received signal according to the modulation order of QAM. A bit deinterleaver 320 deinterleaves the bit LLRs in a deinterleaving pattern corresponding to the interleaving pattern used in the bit interleaver 218 of the transmitter. A rate dematcher 322 rate-dematches the deinterleaved bit LLRs by combining the deinterleaved bit LLRs on a symbol basis, reversely to the rate matching of the rate matcher 216 of the transmitter. The bit deinterleaver 320 may be configured to operate in consideration of at least one of a modulation order, a coding rate, and a repetition number that are used in the transmitter. The rate dematcher 322 may also be configured to operate in consideration of the coding rate and the repetition number that are used in the transmitter.

A binary channel decoder 324 recovers information bits by channel-decoding the rate-dematched bit LLRs according to the modulation order and the coding rate used in the binary channel encoder 214 of the transmitter.

Figure 4:
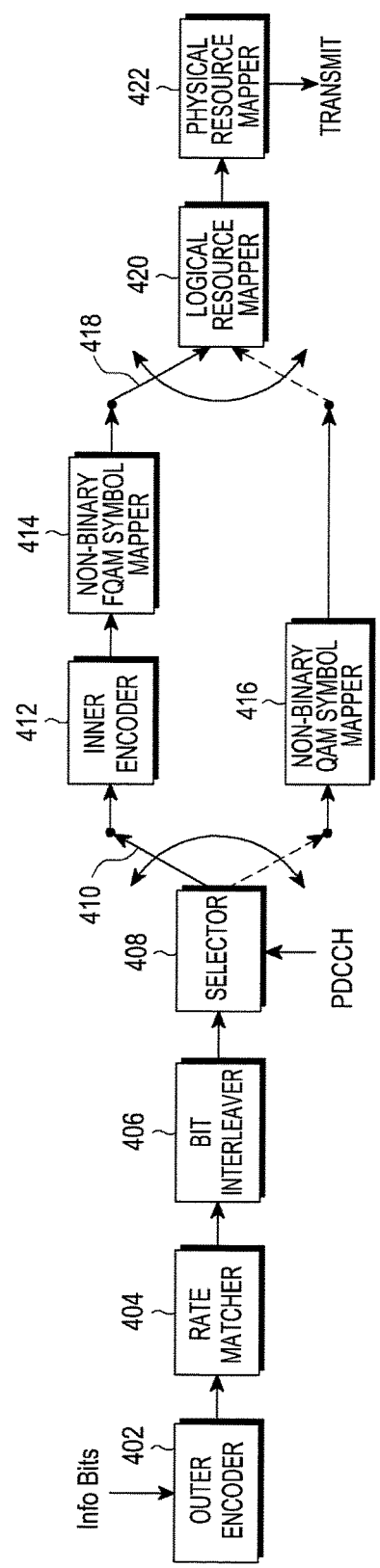
FIG. 4 is a block diagram of a transmitter supporting QAM and FQAM according to another embodiment of the present disclosure.

FIG. 4 is a block diagram of a transmitter supporting QAM and advanced QAM according to another embodiment of the present disclosure. The transmitter uses basically a predetermined channel coding scheme, for example, non-binary channel coding irrespective of a used modulation scheme and uses an additional channel coding scheme for advanced QAM. While FQAM will be described below as an example of advanced QAM, it is obvious that the present disclosure is not limited to FQAM.

Referring to FIG. 4, an outer encoder 402 generates a first coded bit stream by encoding input information bits. The outer encoder 402 may use, for example, a turbo code, a Low Density Parity Check (LDPC) code, a convolutional code, a Repeat-Accumulate (RA) code, or the like. A rate matcher 404 matches the first coded bit stream to an intended transmission rate. A bit interleaver 406 interleaves the rate-matched bit stream in a predetermined interleaving pattern.

A selector 408 selects a modulation scheme according to at least one preset criterion such as a reception SINR fed back from a receiver, HARQ support or non-support, a receiver capability, the non-Gaussian degree of neighbor cell interference, and/or the like. A switch 410 switches the rate-matched bit stream input to the selector 408 to one of an FQAM path 412 and 414 and a QAM path 416 according to the selected modulation scheme. In an optional embodiment of the present disclosure, the selector 408 may act as a controller that additionally determines a modulation order(s) for QAM and/or FSK, a coding rate, and the like as well as a modulation scheme, based on given channel state information and additional parameters.

If the selector 408 selects FQAM, the rate-matched bit stream is provided to an inner encoder 412 of the FQAM path. The inner encoder 412 may use, for example, a Trellis code. An FQAM symbol mapper 414 maps a second coded bit stream generated from the inner encoder 412 to M-ary FQAM symbols. The FQAM symbol mapper 414 generates an FQAM symbol sequence by mapping a predetermined number of (e.g., $M=M_Q*M_F$) bit groups out of the second coded bit stream to FQAM symbols according to the modulation order M of FQAM determined based on the modulation order $M_Q$ of QAM and the amodulation order $M_F$ of FSK. The modulation order M may be determined according to an MCS level selected as satisfying a target FER according to a measurement representing a channel state, such as an SNR, an SINR, or the like.

A logical resource mapper 420 maps the symbol sequence received from the FQAM symbol mapper 414 to a given logical resource area. A physical resource mapper 422 maps the symbol sequence mapped to the logical resource area to a given physical resource area. The logical resource mapper 420 allocates the input symbol sequence to frequency tones or subcarriers, taking into account FQAM, particularly FSK. The symbol sequence output from the physical resource mapper 422 is transmitted in the physical resource area via an air interface.

On the other hand, if the selector 408 selects QAM, the rate-matched bit stream is provided to a QAM symbol mapper 416 of the QAM path. The QAM symbol mapper 416 maps a predetermined number of (e.g., M) bit groups out of the rate-matched bit stream to QAM symbols according to a given modulation order M. The modulation order M may be determined according to an MCS level selected as satisfying a target FER according to a measurement representing a channel state, such as an SNR, an SINR, or the like. A switch 418 switches the QAM symbol sequence to the logical resource mapper 420.

The logical resource mapper 420 maps the input symbol sequence to a given logical resource area. The physical resource mapper 422 maps the symbol sequence mapped to the logical resource area to a given physical resource area. The symbol sequence output from the physical resource mapper 422 is transmitted in the physical resource area via an air interface.

Figure 5:
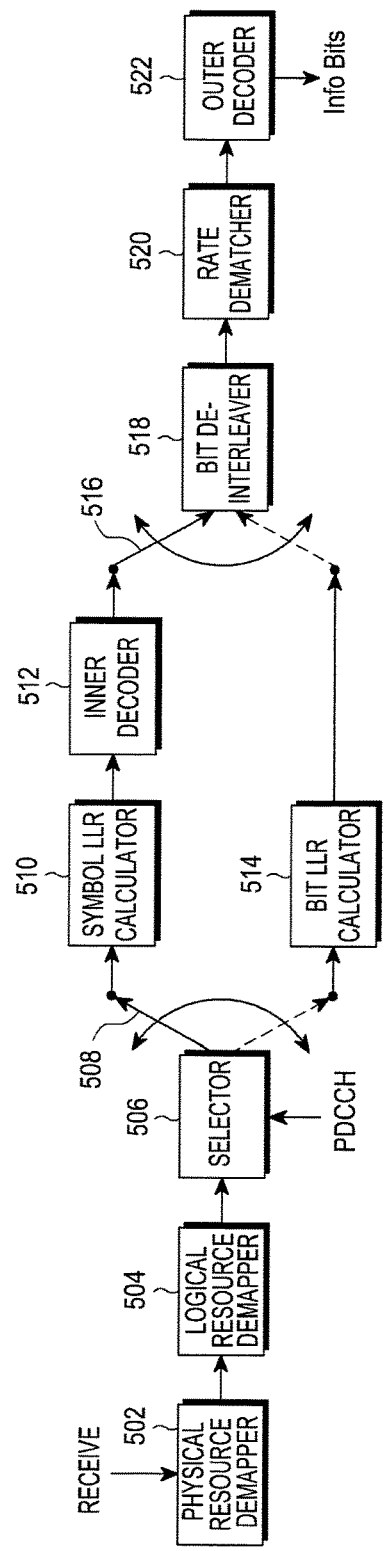
FIG. 5 is a block diagram of a receiver supporting QAM and FQAM according to another embodiment of the present disclosure.

FIG. 5 is a block diagram of a receiver supporting QAM and advanced QAM according to another embodiment of the present disclosure. The receiver is configured in correspondence with the configuration of the transmitter illustrated in FIG. 4. The receiver performs non-binary channel decoding to receive an advanced QAM signal and performs binary channel decoding to receive a QAM signal. While FQAM will be described below as an example of advanced QAM, it is obvious that the present disclosure is not limited to FQAM.

Referring to FIG. 5, a physical resource demapper 502 detects a signal mapped to a given physical resource area from a received signal. A logical resource demapper 504 detects a signal mapped to given logical resources from the detected signal. A selector 506 determines the same modulation scheme as used in the transmitter, as indicated by the transmitter. In another embodiment, the selector 506 may select a modulation scheme applied to the received signal using the same algorithm as used in the transmitter. A switch 508 switches the received signal detected by the physical resource demapper 502 and the logical resource demapper 504 to one of a FQAM path 510 and 512 and a QAM path 514. In an optional embodiment of the present disclosure, the selector 506 may operate as a controller that additionally determines a modulation order(s) for QAM and/or FSK, a coding rate, a repetition number, and the like as well as a modulation scheme using the same selection algorithm as used in the transmitter, based on given channel state information and additional parameters.

If it is determined that the received signal was modulated in FQAM, the received signal is provided to a symbol LLR calculator 510 of the FQAM path. The symbol LLR calculator 510 calculates the LLRs of symbols to be recovered from the received signal according to the modulation order of FQAM. An inner decoder 512 recovers coded bits by channel-decoding the LLRs at the coding rate used in the inner encoder 412 of the transmitter. In another embodiment of the present disclosure, the inner decoder 512 may output a coded bit stream, soft values, or hard values.

On the other hand, if it is determined that the received signal was modulated in QAM, the received signal is provided to a bit LLR calculator 514 of the QAM path. The bit LLR calculator 514 calculates the LLRs of bits to be recovered from the received signal according to the modulation order of QAM.

A bit deinterleaver 518 deinterleaves the values received from the inner decoder 512 or the bit LLRs received from the bit LLR calculator 514 in a deinterleaving pattern corresponding to the interleaving pattern used in the bit interleaver 406 of the transmitter. A rate dematcher 520 rate-dematches the deinterleaved values on a bit basis, reversely to the rate matching of the rate matcher 404 of the transmitter. The bit deinterleaver 518 may be configured to operate in consideration of at least one of a modulation order, a coding rate, and a repetition number that are used in the transmitter. The rate dematcher 520 may also be configured to operate in consideration of the coding rate and the repetition number that are used in the transmitter.

An outer decoder 522 recovers information bits by channel-decoding the rate-dematched values at a coding rate used in the outer encoder 402 of the transmitter.

While the transmitters/the receivers illustrated in FIGS. 2 to 5 are configured to include a rate matcher/dematcher and an interleaver/deinterleaver, the rate matcher/dematcher and the interleaver/deinterleaver may be disposed at different positions or may be omitted.

Figure 6:
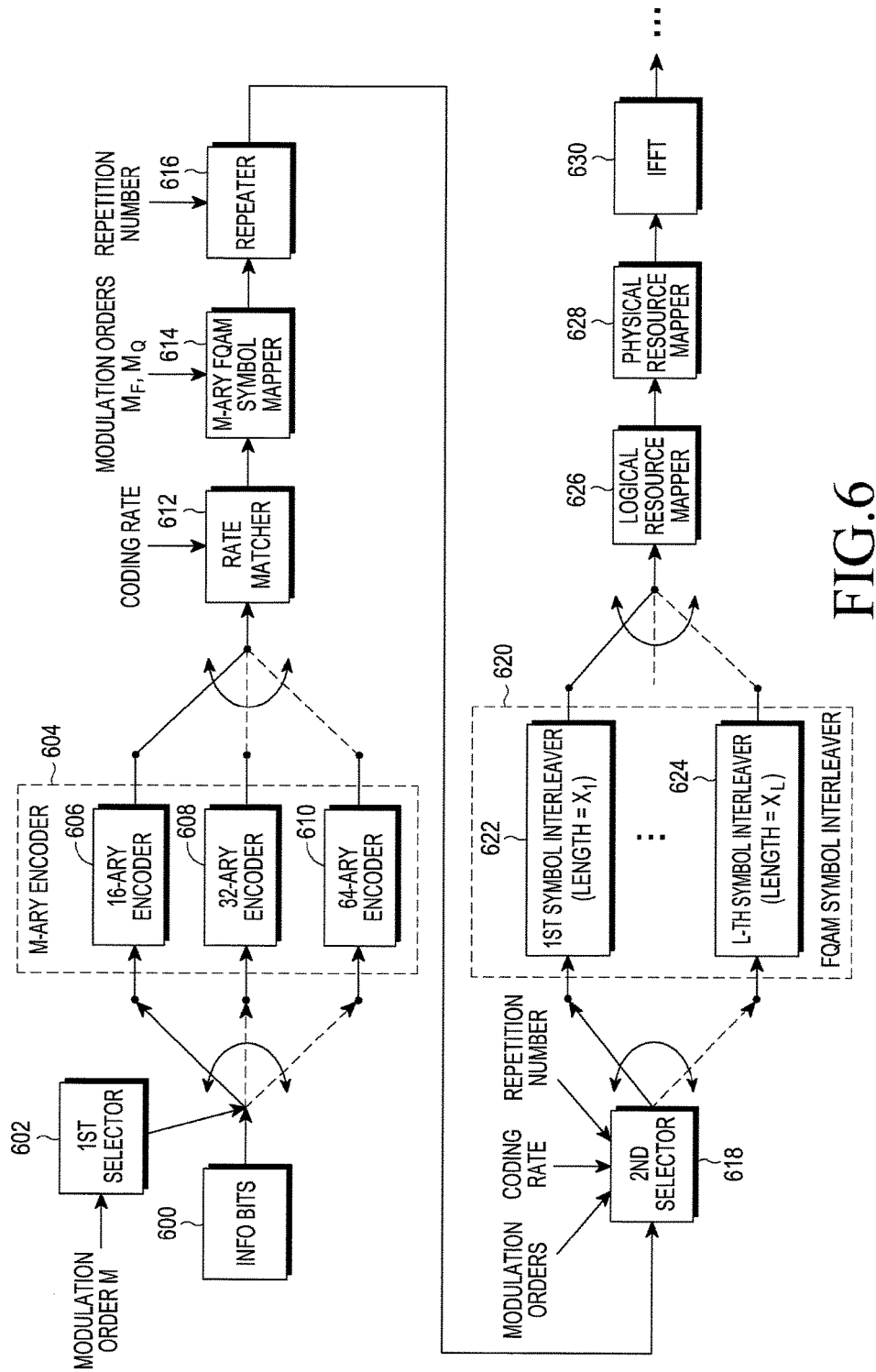
FIG. 6 is a block diagram of a transmitter supporting FQAM and M-ary Coded Modulation (CM) according to an embodiment of the present disclosure.

FIG. 6 is a block diagram of a transmitter supporting FQAM and M-ary Coded Modulation (CM) according to an embodiment of the present disclosure.

Referring to FIG. 6, a first channel selector 602 receives information bits 600 and outputs m information bits out of the information bits 602 to an M-ary encoder 604 according to a given modulation order M. That is, 4 information bits are input to a 16-ary encoder 606, 5 information bits to a 32-ary encoder 608, and 6 information bits to a 64-ary encoder 610, according to m=log$_2$(M). Herein, the modulation order M is determined based on M$_F$ and M$_Q$ which are determined by a channel quality feedback (that is, a received signal strength) received from a receiver and a request of a neighbor BS (transmitter) or a higher-layer entity. That is, it is determined that M=M$_F$*M$_Q$ where M$_F$ is an FSK parameter, that is, the modulation order of FSK and M$_Q$ is a QAM parameter, that is, the modulation order of QAM. The modulation orders M$_F$ and M$_Q$ will be described later in detail with reference to FIG. 7.

A rate matcher 612 matches a coded bit stream received from the M-ary encoder 604 to an intended coding rate. An M-ary FQAM symbol mapper 614 generates an FQAM symbol sequence by mapping each of input bit streams to one complex symbol according to the modulation orders M$_F$ and M$_Q$. A repeater 616 repeats the complex symbols received from the M-ary FQAM symbol mapper 614*a* predetermined number of times.

A second selector 618 provides the repeated symbols to an FQAM symbol interleaver 620, that is, one of first to L$^{th}$ symbol interleavers 622 and 624 according to the modulation order, coding rate, and repetition number of the input symbol sequence. Each of the first to L$^{th}$ symbol interleavers 622 and 624 interleaves an input symbol sequence on a symbol basis in a predetermined interleaving pattern, that is, according to a predetermined length ranging from X$_1$ to X$_L$. A logical resource mapper 626 generates a logical resource-mapped symbol sequence by mapping a symbol sequence received from the FQAM symbol interleaver 620 to a logical resource area to be used for transmission and provides the logical resource-mapped symbol sequence to a physical resource mapper 628. The physical resource mapper 628 generates a physical resource-mapped symbol sequence by mapping the logical resource-mapped symbol sequence to a physical resource area to be used for transmission. An Inverse Fast Fourier Transform (IFFT) processor 630 IFFT-processes the physical resource-mapped symbol sequence. The IFFT symbol sequence is transmitted via the air interface after additional processing.

The transmitter illustrated in FIG. 6 requires a controller that determines the modulation orders M, M$_F$, and M$_Q$, the coding rate, and the repetition time in order to determine an appropriate transmission scheme. Hereinbelow, a description will be given of an operation for determining modulation orders M, M$_F$, and M$_Q$, a coding rate, and a repetition time in a controller of a transmitter, with reference to FIG. 7.

Figure 7:
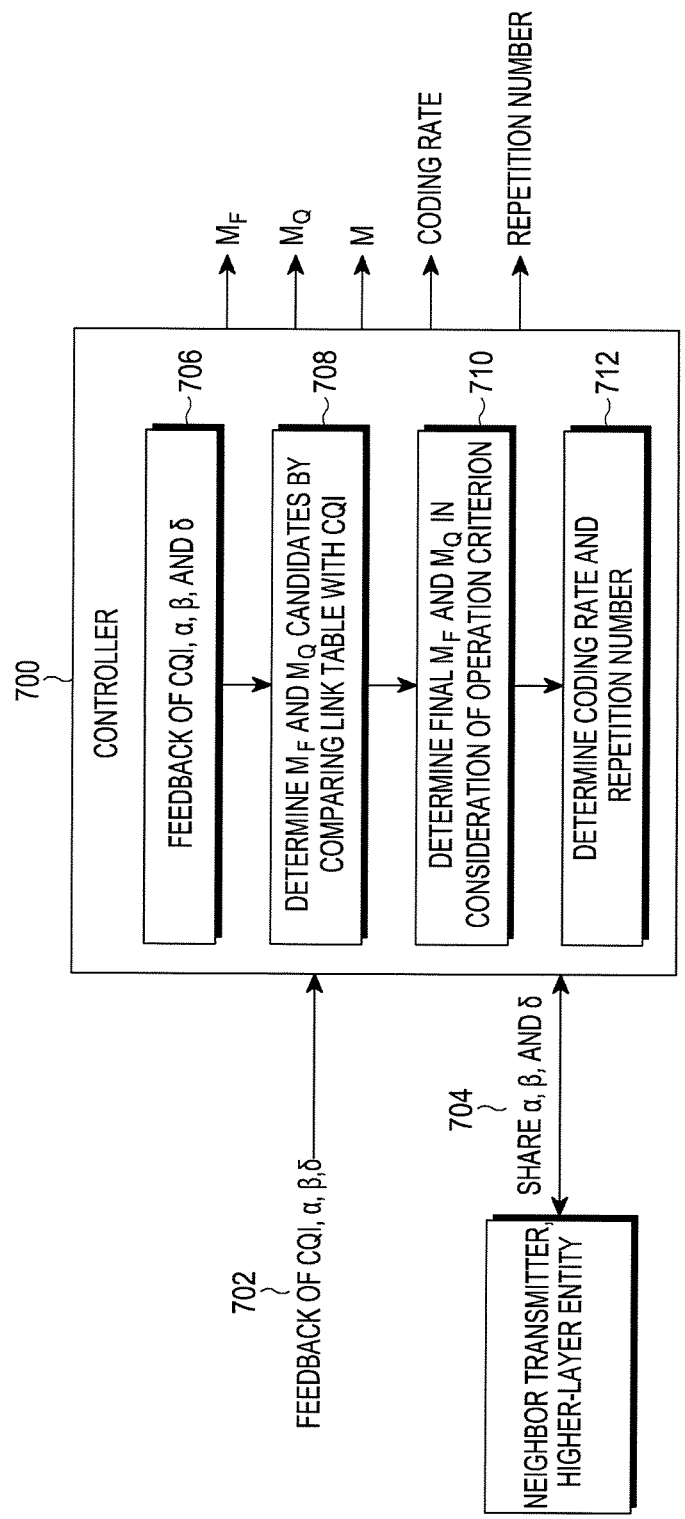
FIG. 7 illustrates a control operation for a transmitter supporting FQAM and M-ary CM according to an embodiment of the present disclosure.

FIG. 7 illustrates an operation of a controller in a transmitter supporting FQAM and M-ary CM according to an embodiment of the present disclosure.

Referring to FIG. 7, a controller 700 receives a feedback of a CQI and parameters representing interference components, α, β, and δ from a receiver in operation 702. The reception of the feedback of a CQI and parameters α, β, and δ in the controller 700 may involve an operation of requesting a CQI and parameters α, β, and δ to the receiver by the transmitter and an operation of receiving the CQI and the parameters α, β, and δ from the receiver. The parameters α and β are statistical parameters modeled under the assumption that interference components of an interference channel has a Complex Generalized Gaussian (CGG) distribution. For example, the parameters α and β may be calculated by the following equation.

$$\begin{cases} \alpha = \dfrac{\ln(3^6/2^{10})}{\ln\left((E[|J_l[k]|])^2/E[|J_l[k]|^2]\right) - \dfrac{\pi}{4} + \dfrac{9}{23.5}\right) + \ln\left(\dfrac{3}{2\sqrt{2}}\right)} \\ \beta = \dfrac{\Gamma(2/\alpha)}{\Gamma(3/\alpha)} E[|J_l[k]|] \end{cases} \quad \text{Equation 1}$$

In <Equation 1>, Y represents a received signal, H represents channels, s represents a transmitted signal, and J represents an interference signal.

Further, k represents the index of an FQAM symbol mapped to a subcarrier, an FQAM symbol includes frequency tones in units of M$_F$ frequency tones, l represents a frequency tone index, and l=1, . . . , M$_F$.

$$\Gamma(x) = \int_0^\infty t^{x-1}\exp(-t)dt$$

is a gamma function J$_l$[k]=Y$_l$[k]−H$_{1,l}$[k]s[k]η$_{m[k],l}$, representing a value except for a desired signal in a k$^{th}$ FQAM received signal. For the k$^{th}$ FQAM signal, l ranges from 1 to M$_F$ for a total of M$_F$ frequency tones. The desired signal exists only in M[k] frequency tones carting the FQAM signal among the total of M$_F$ frequency tones. Accordingly, for m[k] frequency tones among the frequency tones represented by l ranging from 1 to M$_F$, a value except the desired signal is equal to the sum of an interference signal and noise, whereas for the other frequency tones, the received signal itself is equal to the sum of an interference signal and noise. H$_{l,l\ [k]}$ represents channel information corresponding to a desired signal for a k$^{th}$ FQAM symbol, s[k]represents a QAM signal for a k$^{th}$ transmitted symbol, and η$_{m[k],l}$ is a delta function. Here, m[k] represents the index of a frequency tone carrying an FQAM signal.

In this manner, the parameter α may be derived from a secondary statistic of a value obtained by excluding an intended signal component from the received signal and the parameter β may be derived from a primary statistic of the value obtained by excluding a signal directed to the MS from the received signal. The parameter δ is an index representing the difference between an interference statistic model calculated by the receiver, for example, an Inter-Carrier Interference (ICI) histogram and a CGG distribution modeled based on the parameters α and β. For example, if the difference between the interference statistic model and the CGG distribution is not large, the parameter δ is determined to be 0 and if the difference is large, the parameter δ is determined to be 1

The transmitter shares the parameters α, β, and δ representing interference components, fed back from the receiver, with a neighbor transmitter (or BS) or a higher-layer entity in operation 704 and estimates a receiver interference situation in its communication area. If the transmitter determines that the interference situation of the receiver is close to a normal distribution, the transmitter requests the neighbor transmitter to increase the modulation order M$_F$ so that the normal distribution characteristic of interference with the receiver may be decreased in the communication area of the transmitter. On the contrary, if the transmitter determines that the interference situation is far from the normal distribution, the transmitter notifies the neighbor transmitter that the neighbor transmitter may increase the modulation order M$_Q$ to thereby increase transmission efficiency.

For example, the transmitter receives feedbacks of parameters α and δ representing interference components from receivers in its communication area and operates as follows according to the parameters α and δ.

1) Embodiment 1

If the parameters α received from the receivers are mostly 2 and the parameters δ received from the receivers are mostly 0, the transmitter determines that an interference situation experienced by the receivers is close to a normal distribution and determines $M_F$ and $M_Q$ candidates by comparing CQIs with a link table listing link performance values with respect to MCSs.

In addition, the transmitter determines whether a neighbor transmitter or a higher-layer entity has requested an increase of the modulation order $M_F$ or $M_Q$. Upon receipt of the request for increasing the modulation order $M_F$ or $M_Q$, the transmitter determines final the modulation order $M_F$ and $M_Q$ by determining whether the request is to be accepted.

Subsequently, the transmitter requests the neighbor transmitter or the higher-layer entity to increase the modulation order $M_F$.

2) Embodiment 2

If the parameters α received from the receivers are mostly less than 2 and the parameters δ received from the receivers are mostly 0, the transmitter determines that the interference situation experienced by the receivers is not close to the normal distribution but corresponds to a CGG distribution, and determines $M_F$ and $M_Q$ candidates by comparing CQIs with a link table listing link performance values with respect to MCSs.

In addition, the transmitter determines whether a neighbor transmitter or a higher-layer entity has requested an increase of the modulation order $M_F$ or $M_Q$. Upon receipt of the request for increasing the modulation order $M_F$ or $M_Q$, the transmitter determines final the modulation orders $M_F$ and $M_Q$ by determining whether the request is to be accepted.

Subsequently, the transmitter notifies the neighbor transmitter or the higher-layer entity that the neighbor transmitter or the higher-layer entity may increase the modulation order $M_Q$.

3) Embodiment 3

If the parameters δ received from the receivers are mostly 1, the transmitter determines that the interference situation experienced by the receivers is very different from the CGG distribution and determines $M_F$ and $M_Q$ candidates by comparing CQIs with a link table listing link performance values with respect to MCSs.

In addition, the transmitter determines whether a neighbor transmitter or a higher-layer entity has requested an increase of the modulation order $M_F$ or $M_Q$. Upon receipt of the request for increasing the modulation order $M_F$ or $M_Q$, the transmitter determines final the modulation orders $M_F$ and $M_Q$ by determining whether the request is to be accepted.

Subsequently, the transmitter notifies the neighbor transmitter or the higher-layer entity that the neighbor transmitter or the higher-layer entity may increase the modulation order $M_Q$.

An operation for determining final modulation orders $M_F$ and $M_Q$ in Embodiment 1, Embodiment 2, and Embodiment 3 will be described below in detail.

The controller 700 acquires a CQI and parameters α, β, and δ in operation 706 and determines $M_F$ and $M_Q$ candidates by comparing the CQI with a link table listing link performance values with respect to MCSs in operation 708. In addition, the controller 700 determines final modulation orders $M_F$ and $M_Q$ according to an operation criterion such as whether a request for increasing the modulation order $M_F$ or $M_Q$ has been received from a neighbor transmitter or a higher-layer entity or whether to accept the request in operation 710.

Subsequently, the controller 700 determines a coding rate and a repetition number for application to the transmitter in operation 712.

Figure 8:
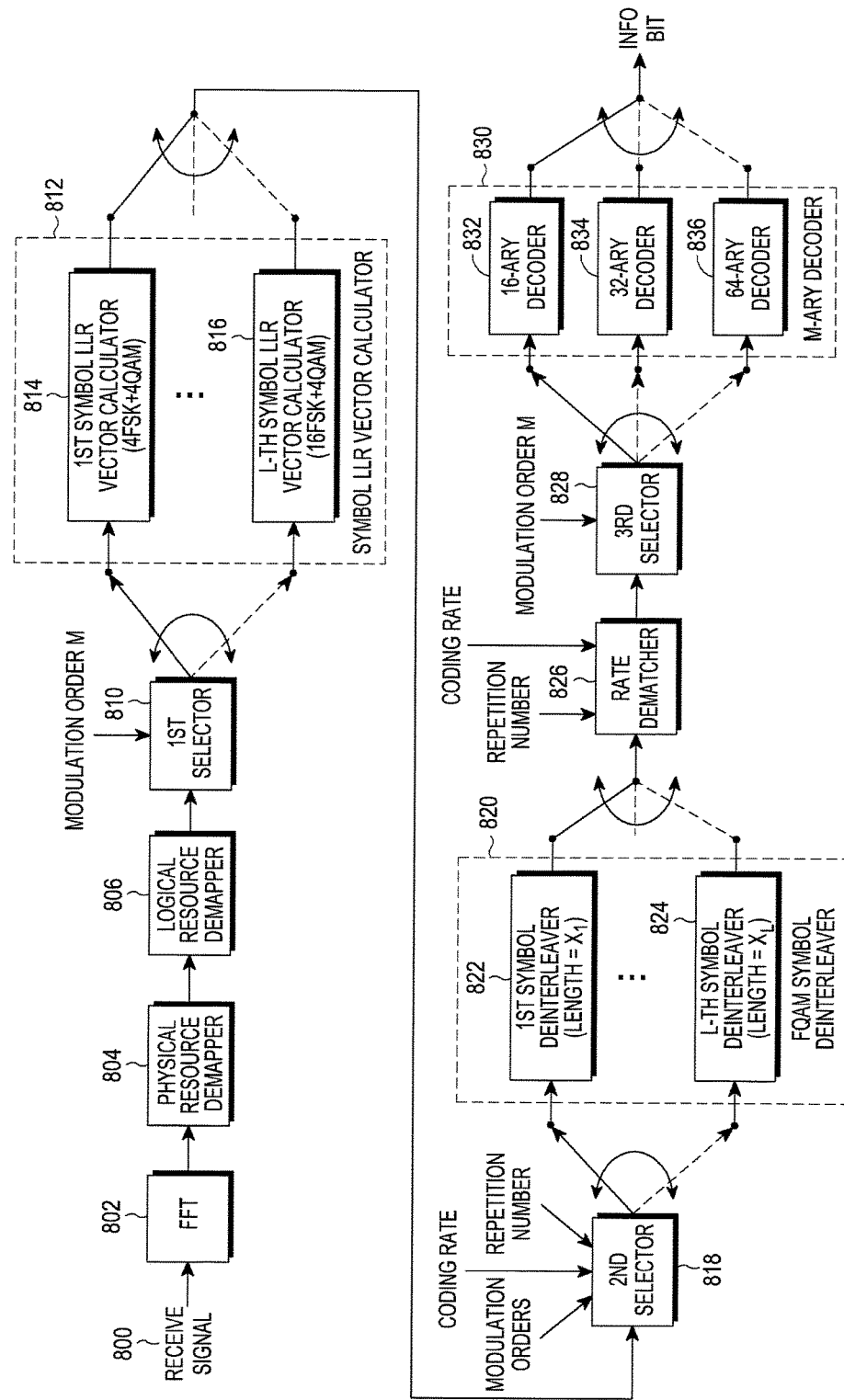
FIG. 8 is a block diagram of a receiver supporting FQAM and M-ary CM according to an embodiment of the present disclosure.

FIG. 8 is a block diagram of a receiver supporting FQAM and M-ary CM according to an embodiment of the present disclosure.

Referring to FIG. 8, a Fast Fourier Transform (FFT) processor 802 FFT-processes a received signal 800. A physical resource demapper 804 detects a signal mapped to a given physical resource area from the FFT signal received from the FFT processor 802. A local resource demapper 806 detects a signal mapped to given logical resources from the detected signal.

A first selector 810 provides the received signal detected by the physical resource demapper 804 and the logical resource demapper 806 to a symbol LLR vector calculator 812 according to a modulation order M used in a transmitter, that is, modulation orders $M_F$ and $M_Q$. Specifically, if it is determined that the received signal was modulated in 4-FSK and 4-QAM according to the modulation order M, the first selector 810 provides the received signal to a first symbol LLR vector calculator 814. If it is determined that the received signal was modulated in 16-FSK and 16-QAM according to the modulation order M, the first selector 810 provides the received signal to an $L^{th}$ symbol LLR vector calculator 816. While not shown, the symbol LLR vector calculator 812 may further include second to $(L-1)^{th}$ symbol LLR vector calculators. If it is determined that the received signal was modulated in 2-FSK and 8-QAM, in 8-FSK and 2-QAM, in 8-FSK and 8-QAM, or in any other modulation scheme, the first selector 810 provides the received signal to an appropriate one of the second to $(L-1)^{th}$ symbol LLR vector calculators.

The symbol LLR vector calculator 812 calculates the LLRs of symbols to be recovered from the received signal according to the modulation order of FQAM. Herein, the modulation orders $M_F$ and $M_Q$ are indicated to the receiver by the transmitter in advance.

A second selector 818 provides the LLRs of the symbols to an FQAM symbol deinterleaver 820, that is, one of first to $L^{th}$ symbol deinterleavers 822 and 824 according to the modulation order, coding rate, and repetition number of the symbols. Each of the first to $L^{th}$ symbol deinterleavers 822 and 824 deinterleaves the LLRS of the symbols on a symbol basis in a deinterleaving pattern corresponding to an interleaving pattern used in the FQAM symbol interleaver 620 of the transmitter, that is, according to a predetermined length ranging from $X_1$ to $X_L$.

A rate dematcher 826 rate-dematches the deinterleaved values on a symbol basis, reversely to the rate matching of the rate matcher 612 of the transmitter. The rate dematcher 826 operates in consideration of the coding rate and the repetition number that are used in the transmitter. A third selector 828 provides the rate-dematched values to an M-ary decoder 830 according to the modulation order M used in the transmitter. The M-ary decoder 830 outputs information bits according to m=log 2(M). That is, a 16-ary decoder 832 outputs 4 information bits, a 32-ary decoder 834 outputs 5 information bits, and a 64-ary decoder 836 outputs 6 information bits.

Figure 9:
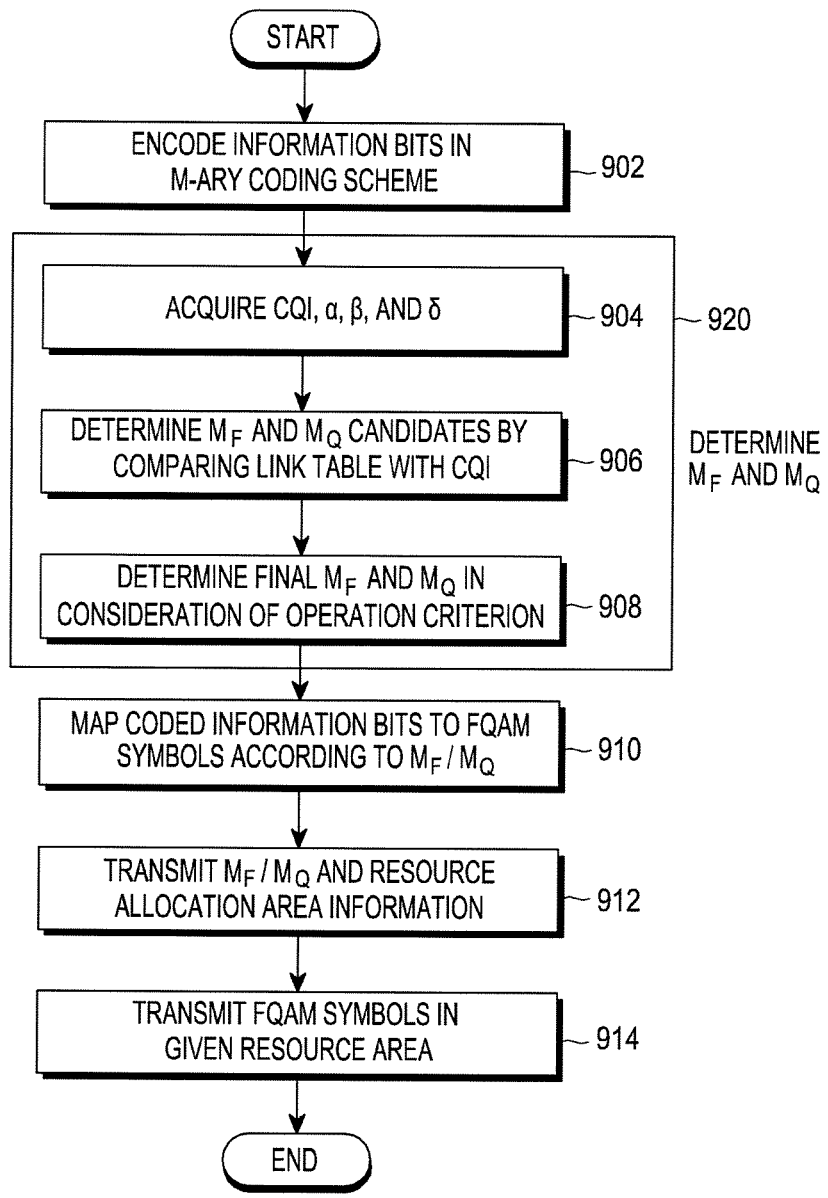
FIG. 9 is a flowchart illustrating a signal transmission operation of a transmitter supporting FQAM and M-ary CM according to an embodiment of the present disclosure.

FIG. 9 is a flowchart illustrating a signal transmission operation of a transmitter supporting FQAM and M-ary CM according to an embodiment of the present disclosure.

Referring to FIG. 9, the transmitter encodes information bits in an M-ary coding scheme in operation 902 and determines modulation orders $M_F$ and $M_Q$ in operation 920. Specifically, the transmitter acquires a feedback of a CQI and parameters α, β, and δ from a receiver in operation 904 and determines $M_F$ and $M_Q$ candidates by comparing the CQI with a link table listing link performance values with respect to MCSs in operation 906. In operation 908, the transmitter determines final modulation orders $M_F$ and $M_Q$ according to an operation criterion such as whether a request for increasing the modulation order $M_F$ or $M_Q$ has been received from a neighbor transmitter or a higher-layer entity or whether to accept the request.

In operation 910, the transmitter maps the coded information bits to FQAM symbols according to the determined modulation orders $M_F$ and $M_Q$. The transmitter transmits information about the modulation orders $M_F$ and $M_Q$ and resource allocation area information about a transmission signal in operation 912 and transmits the FQAM symbols in a given resource area, that is, a resource area indicated by the resource allocation area information in operation 914.

While it has been described in FIG. 9 by way of example that a transmitter maps information bits to FQAM symbols prior to transmission, the transmitter may request a neighbor transmitter or a higher-layer entity to increase a modulation order $M_F$ or $M_Q$, taking into account the values of parameters α and δ in the manner described in Embodiment 1, Embodiment 2, and Embodiment 3.

Figure 10:
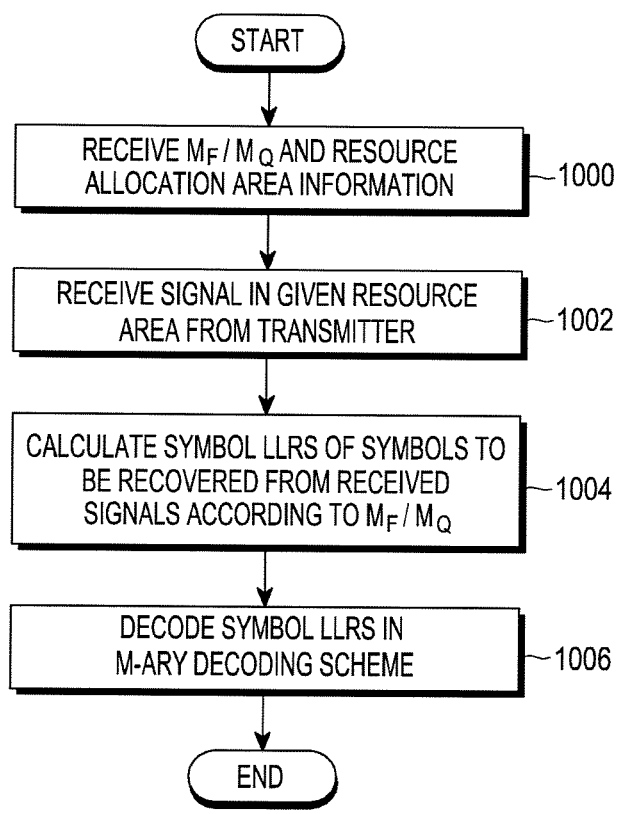
FIG. 10 is a flowchart illustrating a signal reception operation of a receiver supporting FQAM and M-ary CM according to an embodiment of the present disclosure.

FIG. 10 is a flowchart illustrating a signal reception operation of a receiver supporting FQAM and M-ary CM according to an embodiment of the present disclosure.

Referring to FIG. 10, the receiver receives information about modulation orders $M_F$ and $M_Q$ and resource allocation area information about a signal to be received in operation 1000. In operation 1002, the receiver receives the signal from a transmitter in a given resource area, that is, a resource area indicated by the resource allocation area information.

In operation 1004, the receiver calculates LLRs of symbols to be recovered from the received signal according to the modulation orders $M_F$ and $M_Q$. The receiver recovers information bits by decoding the symbol LLRs according to an M-ary coding scheme in operation 1006.

While it has been described in FIG. 10 by way of example that a receiver recovers information bits from a received signal, upon receipt of a request for a CQI and parameters α, β, and δ from a transmitter, the receiver may feed back the CQI and the parameters α, β, and δ to the transmitter.

It is to be clearly understood that the order and layout of function blocks may be changed in the transmitter and receiver configurations. For example, the sequence of rate matching and interleaving may be changed or the rate matching and interleaving may not be performed. In another example, a logical resource mapper and a physical resource mapper may be incorporated into a single resource mapper and a logical resource demapper and a physical resource demapper may be incorporated into a single resource demapper.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method to transmit a signal using a plurality of modulation schemes in a wireless communication system, the method comprising:

determining whether at least one criterion has been satisfied;

in response to satisfying the at least one criterion: selecting a quadrature amplitude modulation (QAM) scheme, encoding information bits for transmission in a first coding scheme, and mapping the coded information bits to QAM symbols;

in response to not satisfying the at least one criterion: selecting advanced QAM scheme comprising a hybrid of a QAM-based modulation scheme and at least one non-QAM modulation scheme, encoding the information bits for transmission in a second coding scheme, and mapping the coded information bits to advanced QAM symbols; and transmitting the QAM symbols or the advanced QAM symbols in a predetermined resource area.

2. The method of claim 1, wherein the advanced QAM scheme includes at least one of:

a hybrid of frequency shift keying (FSK) and QAM (FQAM) scheme, a hybrid of multi-tone frequency shift keying (MT-FSK) scheme representing an FSK symbol using a plurality of active tones, and a hybrid of time shift keying (TSK) and QAM (TQAM) scheme.

3. The method of claim 1, wherein the at least one criterion includes at least one of a received signal strength of a receiver, a support of hybrid automatic repeat request (HARQ) of the receiver, a support of the advanced QAM scheme of the receiver, a non-Gaussian degree of neighbor cell interference, and a position of resources allocated for transmission of the information bits.

4. The method of claim 1, wherein selecting one of the QAM and the advanced QAM scheme based on the satisfied at least one criterion comprises at least one of:

comparing a received signal strength feedback received from a receiver with a predetermined threshold and selecting the advanced QAM scheme when the received signal strength feedback is lower than the predetermined threshold;

selecting the advanced QAM scheme when the information bits are not transmitted in HARQ;

selecting the advanced QAM scheme when the receiver supports the advanced QAM scheme; and selecting a threshold that corresponds to a parameter representing a non-Gaussian degree of neighbor cell interference received from the receiver and selecting the advanced QAM scheme when the received signal strength feedback is lower than the threshold.

5. The method of claim 1, wherein the first coding scheme includes binary channel coding and the second coding scheme includes non-binary channel coding.

6. The method of claim 1, wherein the first coding scheme includes an outer coding and the second coding scheme includes the outer coding and an inner coding.

7. A method to receive a signal that is transmitted using a plurality of modulation schemes in a wireless communication system, the method comprising:

receiving, in a predetermined resource area, a signal transmitted in a modulation scheme that is one of quadrature amplitude modulation (QAM) scheme and advanced QAM scheme based on at least one criterion, the advanced QAM scheme comprising a hybrid of a QAM-based modulation scheme and at least one non-QAM modulation scheme;

when the signal is transmitted in the QAM scheme, calculating symbol Log Likelihood Ratios (LLRs) of symbols to be recovered from the received signal and recovering information bits by decoding the symbol LLRs in a first decoding scheme; and when the signal is transmitted in the advanced QAM scheme, calculating bit LLRs of bits to be recovered from the received signal and recovering the information bits by decoding the bit LLRs in a second decoding scheme.

8. The method of claim 7, wherein the advanced QAM scheme includes at least one of:
a hybrid of frequency shift keying (FSK) and QAM (FQAM) scheme,
a hybrid of multi-tone frequency shift keying (MT-FSK) scheme representing an FSK symbol using a plurality of active tones, and
a hybrid of time shift keying (TSK) and QAM (TQAM) scheme.

9. The method of claim 7, wherein the at least one criterion includes at least one of a received signal strength of a receiver, a support of hybrid automatic repeat request (HARQ) of the receiver, a support of the advanced QAM scheme of the receiver, a non-Gaussian degree of neighbor cell interference, and a position of resources allocated for transmission of the information bits.

10. The method of claim 7, further comprising receiving information about the modulation scheme applied to the received signal from a transmitter.

11. The method of claim 7, further comprising:
comparing a received signal strength feedback transmitted to a transmitter with a predetermined threshold and selecting the advanced QAM when the received signal strength feedback is lower than the predetermined threshold;
selecting the advanced QAM scheme when the information bits are not received in HARQ;
selecting the advanced QAM scheme when a receiver supports the advanced QAM scheme; and
selecting a threshold that corresponds to a parameter representing a non-Gaussian degree of neighbor cell interference transmitted to the transmitter and selecting the advanced QAM scheme when the received signal strength feedback is lower than the threshold.

12. The method of claim 7, wherein the first decoding scheme includes binary channel decoding and the second decoding scheme includes non-binary channel decoding.

13. The method of claim 7, wherein the first decoding scheme includes an outer decoding and the second decoding scheme includes the outer decoding and an inner decoding.

14. An apparatus to transmit a signal using a plurality of modulation schemes in a wireless communication system, the apparatus comprising:
a processing device configured to:
determine whether at least one criterion has been satisfied;
in response to satisfying the at least one criterion, select a quadrature amplitude modulation (QAM) scheme;
in response to not satisfying the at least one criterion, select an advanced QAM scheme comprising a hybrid of a QAM-based modulation scheme and at least one non-QAM modulation scheme;
a first transmission path configured to encode information bits to be transmitted in a first coding scheme and map the coded information bits to QAM symbols when the QAM scheme is selected;
a second transmission path configured to encode the information bits in a second coding scheme and map the coded information bits to advanced QAM symbols when the advanced QAM scheme is selected; and
a resource mapping device configured to transmit the QAM symbols or the advanced QAM symbols in a predetermined resource area.

15. The apparatus of claim 14, wherein the advanced QAM scheme includes at least one of:
a hybrid of frequency shift keying (FSK) and QAM (FQAM) scheme,
a hybrid of multi-tone frequency shift keying (MT-FSK) scheme representing an FSK symbol using a plurality of active tones, and
a hybrid of time shift keying (TSK) and QAM (TQAM) scheme.

16. The apparatus of claim 14, wherein the at least one criterion includes at least one of a received signal strength of a receiver, a support of hybrid automatic repeat request (HARQ) of the receiver, a support of the advanced QAM scheme of the receiver, a non-Gaussian degree of neighbor cell interference, and a position of resources allocated for transmission of the information bits.

17. The apparatus of claim 14, wherein the processing device is configured to perform at least one of:
comparing a received signal strength feedback received from a receiver with a predetermined threshold and selecting the advanced QAM scheme when the received signal strength feedback is lower than the predetermined threshold,
selecting the advanced QAM scheme when the information bits are not transmitted in HARQ,
selecting the advanced QAM scheme when the receiver supports the advanced QAM scheme, and
selecting a threshold corresponding to a parameter representing a non-Gaussian degree of neighbor cell interference received from the receiver and selecting the advanced QAM scheme when the received signal strength feedback is lower than the threshold.

18. The apparatus of claim 14, wherein the first coding scheme includes binary channel coding and the second coding scheme includes non-binary channel coding.

19. The apparatus of claim 14, wherein the first coding scheme includes an outer coding and the second coding scheme includes the outer coding and an inner coding.

20. An apparatus to receive a signal that is transmitted using a plurality of modulation schemes in a wireless communication system, the apparatus comprising:
a demapping device configured to receive, in a predetermined resource area, a signal transmitted in a modulation scheme that is one of quadrature amplitude modulation (QAM) scheme and advanced QAM scheme based on at least one criterion, the advanced QAM scheme comprising a hybrid of a QAM-based modulation scheme and at least one non-QAM modulation scheme;
a processing device configured to identify a modulation scheme applied to the received signal;
a first reception path configured to calculate symbol Log Likelihood Ratios (LLRs) of symbols to be recovered from the received signal and recover information bits by decoding the symbol LLRs in a first decoding scheme when the signal is transmitted in the QAM scheme; and
a second reception path configured to calculate bit LLRs of bits to be recovered from the received signal and recover the information bits by decoding the bit LLRs in a second decoding scheme when the signal is transmitted in the advanced QAM scheme, wherein when the advanced QAM scheme is selected, a signal corresponding to each of advanced QAM symbols is received on predetermined frequency tones in the predetermined resource area.

21. The apparatus of claim 20, wherein the advanced QAM scheme includes at least one of:
a hybrid of frequency shift keying (FSK) and QAM (FQAM) scheme,
a hybrid of multi-tone frequency shift keying (MT-FSK) scheme representing an FSK symbol using a plurality of active tones, and
a hybrid of time shift keying (TSK) and QAM (TQAM) scheme.

22. The apparatus of claim 20, wherein the at least one criterion includes at least one of a received signal strength of a receiver, a support of hybrid automatic repeat request (HARQ) of the receiver, a support of the advanced QAM scheme of the receiver, a non-Gaussian degree of neighbor cell interference, and a position of resources allocated for transmission of the information bits.

23. The apparatus of claim 20, wherein the processing device is configured to receive information about the modulation scheme applied to the received signal from a transmitter.

24. The apparatus of claim 20, wherein the processing device is configured to perform at least one of:
comparing a received signal strength feedback transmitted to a transmitter with a predetermined threshold and selecting the advanced QAM scheme when the received signal strength feedback is lower than the predetermined threshold,
selecting the advanced QAM scheme when the information bits are not received in HARQ,
selecting the advanced QAM scheme when the receiver supports the advanced QAM scheme, and
selecting a threshold corresponding to a parameter representing a non-Gaussian degree of neighbor cell interference transmitted to the transmitter and selecting the advanced QAM scheme when the received signal strength feedback is lower than the threshold.

25. The apparatus of claim 20, wherein the first decoding scheme includes binary channel decoding and the second decoding scheme includes non-binary channel decoding.

26. The apparatus of claim 20, wherein the first decoding scheme includes an outer decoding and the second decoding scheme includes the outer decoding and an inner decoding.

* * * * *